United States Patent
Hirai

(10) Patent No.: US 8,657,711 B2
(45) Date of Patent: Feb. 25, 2014

(54) SILENT CHAIN HAVING DEFORMABLE GUIDE PLATES

(75) Inventor: Akira Hirai, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 139 days.

(21) Appl. No.: 13/217,949

(22) Filed: Aug. 25, 2011

(65) Prior Publication Data

US 2012/0071287 A1  Mar. 22, 2012

(30) Foreign Application Priority Data

Sep. 21, 2010  (JP) .................. 2010-211083

(51) Int. Cl.
*F16G 13/04* (2006.01)
(52) U.S. Cl.
USPC ......................................................... 474/214
(58) Field of Classification Search
USPC ......................... 474/206, 214–217
See application file for complete search history.

(56) References Cited

U.S. PATENT DOCUMENTS

| | | | | |
|---|---|---|---|---|
| 3,742,776 A | * | 7/1973 | Avramidis | 474/215 |
| 5,445,570 A | * | 8/1995 | White | 474/213 |
| 6,383,105 B1 | | 5/2002 | Matsono et al. | |
| 2003/0236145 A1 | * | 12/2003 | Ledvina et al. | 474/215 |
| 2009/0186731 A1 | * | 7/2009 | Tohara | 474/213 |

* cited by examiner

*Primary Examiner* — William E Dondero
*Assistant Examiner* — Diem Tran
(74) *Attorney, Agent, or Firm* — Howson & Howson LLP

(57) ABSTRACT

In a silent chain, guide plates are U-shaped so that they can deform when tension is applied to the chain, thereby avoiding deformation of the connecting pins of the chain and warping of the guide plates. When the chain is unloaded, the frontmost edges of front pin holes of intermediate link plates of each link row are located forward of the frontmost edges of the front pin holes of the guide plates of the same link row, and the rearmost edges of the rear pin holes of the intermediate link plates of each link row are located rearward of the rearmost edges of the rear pin holes of the guide plates of the same link row.

3 Claims, 5 Drawing Sheets

SILENT CHAIN HAVING DEFORMABLE GUIDE PLATES

CROSS REFERENCE TO RELATED APPLICATIONS

This application claims priority on the basis of Japanese Patent Application 2010-211083, filed on Sep. 21, 2010. The disclosure of Japanese Patent Application 2010-211083 is incorporated by reference.

FIELD OF THE INVENTION

This invention relates to a silent transmission chain composed of link plates connected articulably in interleaved rows by link pins, and having guide plates disposed on its outer sides for maintaining alignment of the chain with sprockets with which it is in driving and driven relationship.

BACKGROUND OF THE INVENTION

A typical silent chain for use in power transmission is composed of guide link rows, each comprising a pair of guide plates and a plurality of intermediate link plates disposed between the guide plates, and non-guide link rows, each comprising a plurality of inner link plates. The guide link rows and non-guide link rows are disposed alternately along the length of the chain, and the plates of the guide link rows are interleaved with the plates of the non-guide link rows and connected by connecting pins so that interconnected link rows can articulate relative to each other. Each of the connecting pins can be composed of a long rocker pin and a short rocker pin, having facing rocker surfaces. The long rocker pins are fitted into front and rear holes in the guide plates. Each link plate other than the guide plate has a pair of holes, one of which can be a front hole and the other of which can be a rear hole, the terms "front" and "rear" referring to the direction in which the chain ordinarily moves when in operation. A pair of rocker pins consisting of a long pin and a short pin extends through each of these holes.

In the conventional silent chain 500 shown in FIG. 5, link plates 520 are arranged in guide link rows. Each plate 520 has a pair of teeth and a pair of link pin holes. Link plates 530 are arranged in non-guide link rows. The rows of plates 520 and 530 are pivotally linked by pairs of long and short rocker pins 541 and 542, the pins of each pair having mutually facing rocker surfaces. The pairs of pins extend through front and rear holes of the link plates and the long pins 541 tightly fit into pin holes in guide plates 510 disposed at opposite ends of each of the guide link rows.

Intermediate portions of the guide plates 510 at the opposite ends of each guide link row are formed so that they can overlap both sides of a sprocket tooth and thereby prevent the chain from deviating in the direction of the width of the sprocket.

In operation, tension is imparted directly to the link plates 520 and 530 by the sprocket with which the chain is engaged. However, guide plates 510 are not brought into tension directly by the sprocket teeth directly.

By reason of the slight clearances between the link plates and the rocker pins, and because of their elastic deformation, central parts of the long rocker pins 541 deform while both ends are restricted by the guide plates 510. As shown (with exaggeration) in FIG. 6, the long rocker pins become arcuate in shape, and the guide plates 510 also warp, becoming arcuate in shape.

As a result of the bending of the long rocker pins, the link plates 520 and 530 abut the rocker pins 541 and 542 butt unevenly and tension becomes concentrated locally, reducing the overall tensile strength of the silent chain, increasing elongation of the chain due to excessive wear, and increasing heat and noise due to repetitive deformation.

The deformation described above allows a longitudinal shifting of the link plates 520 and 530, which results in variations in the effective tooth pitch of the chain. The variations in the effective tooth pitch make seating of the teeth unstable, which can cause jumping of the teeth and increased noise.

U.S. Pat. No. 6,383,105, dated May 7, 2002, reduces deformation of the long rocker pins and warping of the guide plates by the use of guide plates which deform in the direction of chain tension. However, guide plates described in U.S. Pat. No. 6,383,105 are unable to prevent deformation of the long rocker pins, and warping of the guide plates fully. The reason is that the front edges of the front pin holes and the rear edges of the rear pin holes of the guide plates are aligned with corresponding front and rear edges of the pin holes of the intermediate link plate when the chain is in an unloaded condition. As a result, tension applied to the chain can still produce a stress causing the link pins to bend and the guide plates to deform.

Another problem with known chains having guide plates that deform in the direction of chain tension is that the angles of the front edges of the front connecting pin holes and the rear edges of the rear connecting pin holes in the guide plates change as the guide plates deform. When these angles change, the shapes of the connecting pin holes in the guide plates do not correspond to the shapes of respective front edges of the front pin holes and rear edges of the rear pin holes in the intermediate link plate. Consequently, the long rocker pins come into point-to-point contact with part of the front and rear link pin holes of the intermediate link plates, generating biased loads, wear, and increased heat and noise.

SUMMARY OF THE INVENTION

The invention addresses the aforementioned problems by providing guide plates that are allowed to deform in the chain tension direction in such a way as to prevent arcuate deformation of link pins and arcuate warping of the guide plates, thereby preventing increased heat and noise, without generating biased wear and biased load between the link pins and the pin holes of intermediate link plates.

The silent chain of the invention is in the form of an endless loop made up of alternating guide link rows and non-guide link rows. Each of the guide link rows, comprises a pair of guide plates and a plurality of intermediate link plates disposed between the guide plates. Each non-guide link row comprises a plurality of inner link plates. The guide link rows and non-guide link rows are disposed alternately along the length of the chain, and the guide plates and intermediate plates of the guide link rows are interleaved with the plates of the non-guide link rows. Each plate has a front hole and a rear hole. Connecting pins connect the guide link rows and non-guide link rows in articulating relationship. The connecting pins have end portions fitted into front and rear holes in the guide plates and extend through holes in the intermediate link plates of the guide link rows and through holes in the inner link plates of the non-guide link rows.

Each guide plate has end portions connected by an intermediate portion, and the front and rear holes of each guide plate are in the end portions of the guide plate. The intermediate portion of each guide plate is located toward the inside of the loop formed by the chain in relation to a pitch line passing through centers of the front and rear pin holes of the guide plate. Each front pin hole has a frontmost edge and each rear pin hole has a rearmost edge. When the chain is unloaded, the frontmost edges of the front pin holes of the intermediate link plates of each link row are located forward of the frontmost edges of the front pin holes of the guide plates of the same link row. Similarly, the rearmost edges of the rear pin holes of the intermediate link plates of each link row are located rearward of the rearmost edges of the rear pin holes of the guide plates of the same link row.

Locating the intermediate portion of each guide plate inside the pitch line allows the guide plates to deform in the direction in which the tension force on the chain acts, and reduces arcuate deformation of the link pins and arcuate warping of the guide plates. Furthermore, the relationship of the frontmost and rearmost edges of the front and rear pin holes of the guide plates with the respective frontmost and rearmost edges of the front and rear pin holes of the intermediate link plates allows the guide plates to remain unloaded until a significant amount of tension is applied to the chain. Consequently, the deformation of the guide plates is minimized and almost no bending stress is generated in the connecting pins. Thus, arcuate bending of the link pins and arcuate warping of the guide plates can be further reduced.

Each of the connecting pins can comprise a pair of rocker pins, the pair consisting of a long rocker pin and a short rocker pin. In this case, the long and short rocker pins have mutually facing rocker surfaces, and the end portions of each pin that are fitted into front and rear holes in a guide plate are end portions of a long rocker pin. Consequently, the guide plates can be small in size and deformable in the direction of chain tension, so that, even if the long rocker pins are deformed by bending stress, their deformation, and the arcuate warp of the guide plates is minimized.

When the chain is under tension, the guide plates are deformable to an extent such that the frontmost edges of the front pin holes of the intermediate link plates of each link row are located laterally opposite the frontmost edges of the front pin holes of the guide plates of the same link row, and the rearmost edges of the rear pin holes of the intermediate link plates of each link row are located laterally opposite the rearmost edges of the rear pin holes of the guide plates of the same link row. The bending stress applied to the connecting pins when tension is applied to the chain can be reduced further, and it becomes possible to reduce the arcuate deformation of the connecting pins and the arcuate warp of the guide plates.

When the edges of the holes are in the above-described laterally-opposed relationships, the shapes of the frontmost edges of the intermediate link plates can coincide with the shapes of the frontmost edges of the front pin holes of the guide plates of the same link row, and the shapes of the rearmost edges of the intermediate link plates can coincide with the shapes of the rearmost edges of the pin holes of the guide. Because of the conformity of the shapes of edges of the pin holes, the connecting pins can come into surface-to-surface contact with the pin holes of the intermediate link plates, reducing localized wear and biased loading.

DETAILED DESCRIPTION OF THE PREFERRED EMBODIMENT

Figure 1:
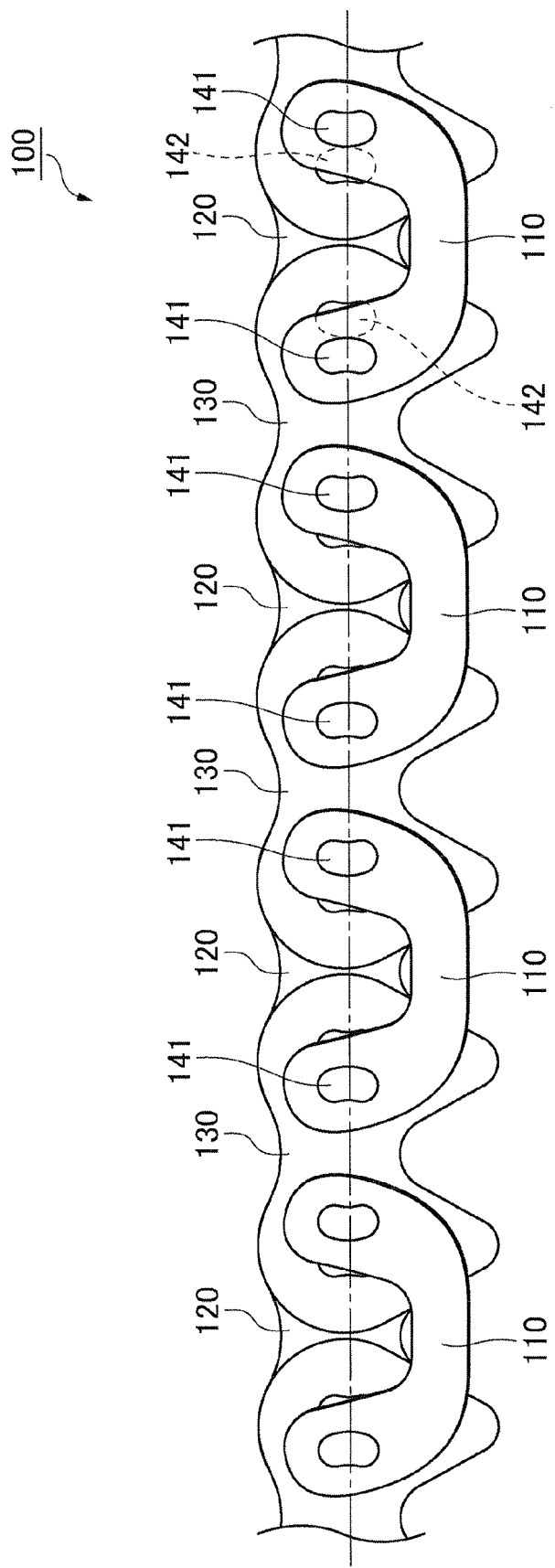
FIG. 1 is a side elevational view of a portion of a silent chain according to the invention.
Figure 2:
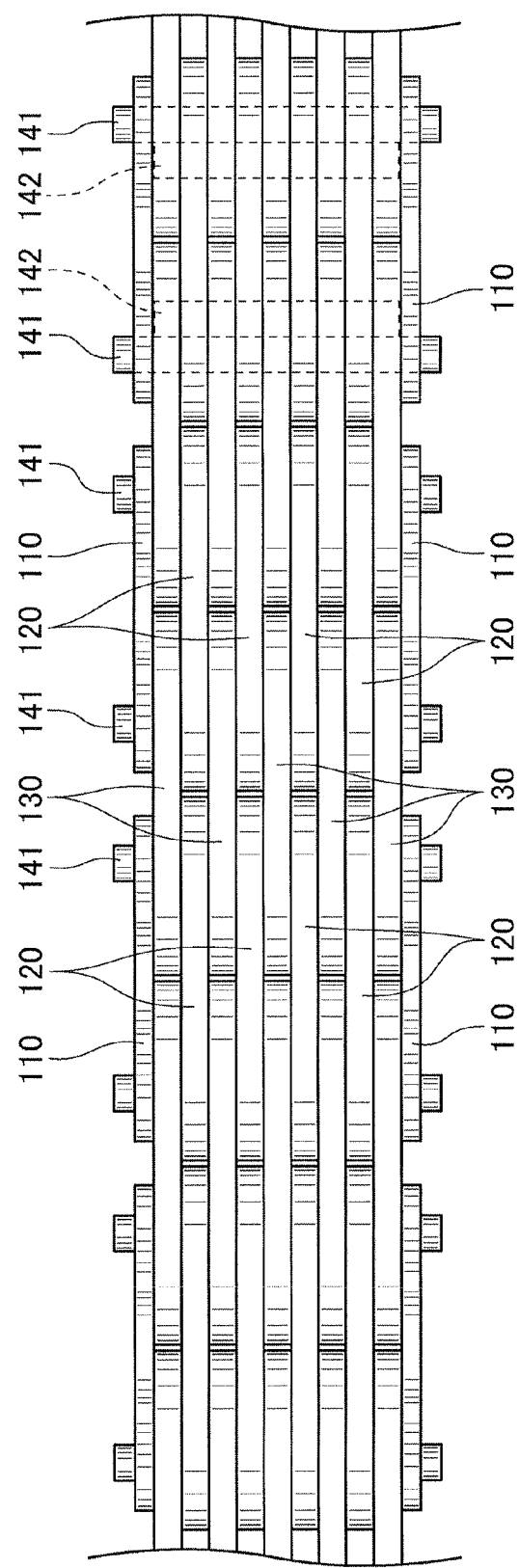
FIG. 2 is a plan view of the silent chain of FIG. 1.

As shown in FIGS. 1 and 2, a silent chain 100 having guide plates 110 is constructed by alternately stacking intermediate link plates 120 in guide link rows with inner link plates 130 in non-guide link rows. Each of the link plates has pair of sprocket-engaging teeth and a pair of connecting pin holes. The plates 130 in the non-guide link rows are pivotally connected to the intermediate link plates 120 by inserting connecting pins each consisting of a long rocker pin 141 and a short rocker pin 142. The rocker pins have mutually facing a rocker surfaces, and are inserted through the connecting pin holes of the intermediate link plates 120 and the inner link plates 130 while their rocker surfaces are in facing engagement. Guide plates 110 are then disposed on the outermost sides of the intermediate link plates 120 of the guide link rows, and the ends of the long rocker pins are fitted to pin holes in the guide plates.

Figure 3:
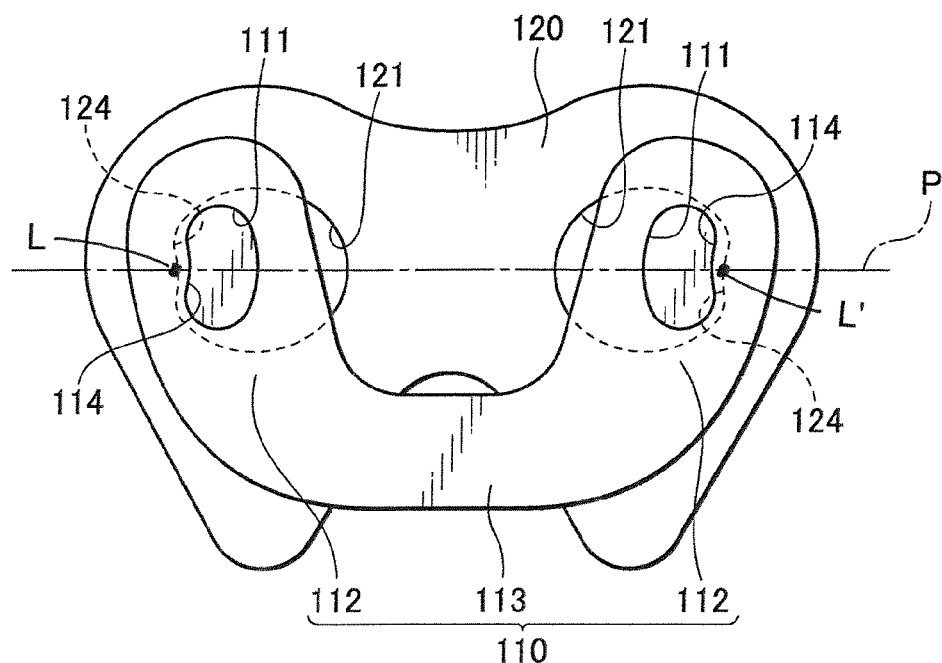
FIG. 3 is side elevational view of a guide link row of a silent chain according to the invention.

As shown in FIG. 3, each guide plate 110 has front and rear end portions 112, having respectively a front and rear connecting pin hole 111. The terms "front" and "rear" refer to the normal direction of movement of the chain, and are of no significance in the embodiment shown because the guide plates are symmetrical. The terms "front" and "rear" are used to define the relationship between the pin holes of the intermediate guide link plates 120 and the pin holes of the guide plates 110. The front and rear end portions of the guide plates 110 are connected by an intermediate portion 113. The intermediate portion 113 is located on the inside of the loop formed by the chain relative to a pitch line P extending through centers of the front and rear pin holes 111 in the guide plate, as shown in FIG. 3.

The outermost surfaces 114 of the front and rear connecting pin holes 111, that is, the frontmost surface of the front pin hole and the rearmost surface of the rear pin hole, are located inside the outermost surfaces 124 of front and rear connecting pin holes 121 of the intermediate link plates 120 in the same guide link row when the chain is in an unloaded condition, i.e., when no tension is applied to the chain. Thus, as shown in FIG. 3, when the chain is unloaded, the frontmost edges 124 (depicted by a broken line) of the front pin holes 121 of the intermediate link plates of each link row are located forward of the frontmost edges 114 of the front pin holes 111 of the guide plates of the same link row. The rearmost edges 124 of the rear pin holes 121 of the intermediate link plates of each link row (also depicted by a broken line) are located rearward of the rearmost edges 114 of the rear pin holes 111 of the guide plates of the same link row.

The long rocker (FIGS. 1 and 2) fit tightly into the front and rear connecting pin holes 111 of the guide plate 110. However, because of the above-described relationship between the frontmost edges of the front pin holes and between the rearmost edges of the rear pin holes, the long rocker pins 141 fit loosely with a predetermined clearance in the front and rear connecting pin holes 121 of the intermediate link plates 120 when no tension is applied to the chain.

The silent chain 100 is restricted from widthwise deviation relative to the sprockets with which it is engaged by contact between the intermediate portions 113 of the guide plates and the sides of the sprocket teeth.

Figure 4:
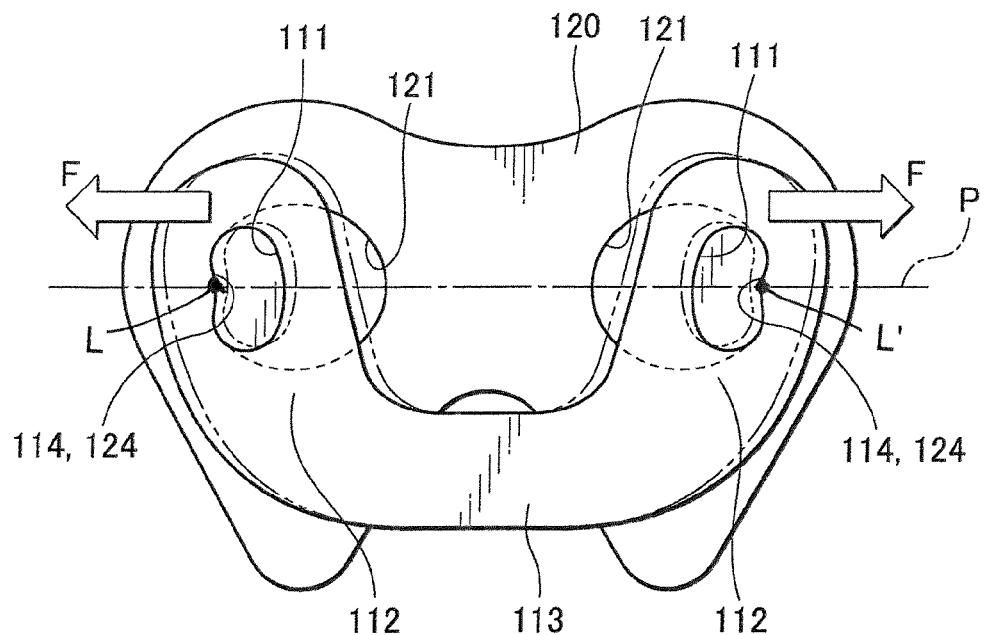
FIG. 4 is similar side elevational view of the guide link row when tension is applied to the guide plate.
Figure 5:
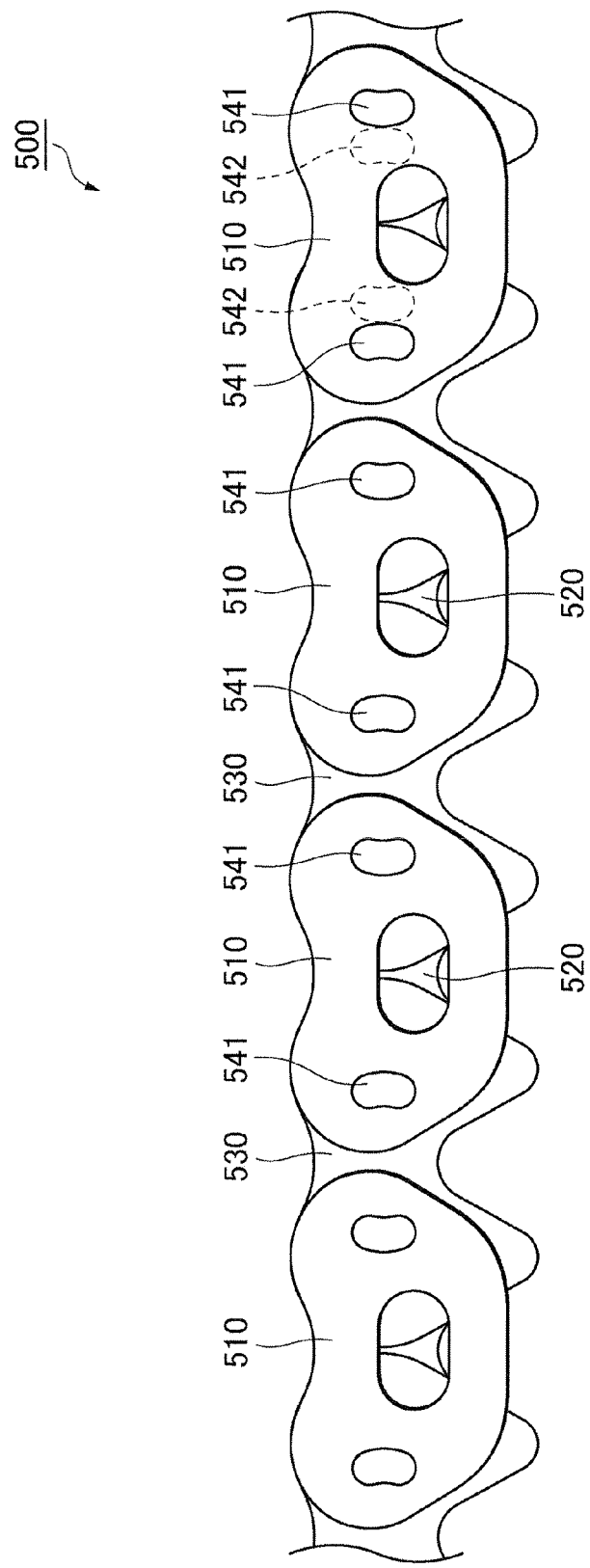
FIG. 5 is a side elevational view of a prior art silent chain.
Figure 6:
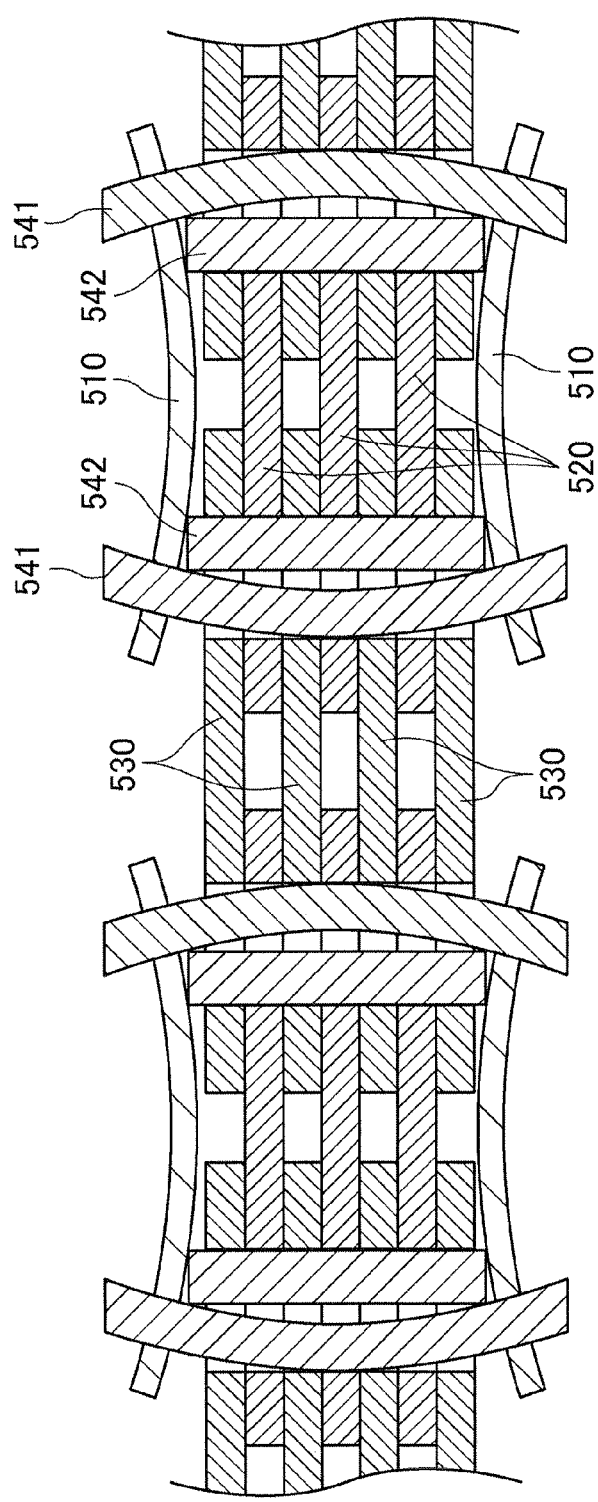
FIG. 6 is an exaggerated cross-sectional view of the conventional silent chain, illustrating the effect of tension applied to the chain.

As shown in FIG. 4, when tension is applied to the chain, the long rocker pins in a guide link row are pulled away from each other. The intermediate portion 113 of the guide plate deforms, and end portions expand, their upper parts moving symmetrically in opposite directions away from the intermediate portion 113. At this time, the frontmost and rearmost edges 114 of the connecting pin holes 111 of the guide plates 110 move respectively to positions laterally opposite the frontmost and rearmost edges 124 of the intermediate link plates 120. When edges are in laterally opposite relationship, imaginary lines, shown endwise as points L and L' in FIGS. 3 and 4, pass through each pair of opposed edges consiting of an edge 114 and an edge 124. These imaginary lines L and L' extend parallel to the lateral direction in which the connecting pins extend.

When the edges 114 are laterally opposite edges 124, the shapes of edges 114 of the connecting pin holes 111 coincide with shapes of edges 124 of the connecting pin holes 121 of the intermediate link plate 120. When the shapes of edges coincide, a continuous portion of one of the edges, extending through the pitch line P, when projected in a direction perpendicular to the faces of the plates of the chain, coincides with a corresponding continuous portion of the other edge.

The long rocker pins 141, evenly abut surfaces 124 of the holes 121 of the intermediate link plate 120 when tension is applied to the chain. Consequently, it becomes possible to reduce bending stress and to prevent arcuate deformation of the long rocker pins 141 and arcuate warp of the guide plates 110.

Because the shapes of the frontmost and rearmost surfaces 114 of the connecting pin holes 111 coincide respectively with the shapes of the frontmost and rearmost surfaces 124 of the intermediate link plates 120, surface contact is established between the long rocker pins 141 and edges 124 of the connecting pin holes 121 of the intermediate link plates 120. Point contact is avoided, and, accordingly, excessive wear and biased loading are prevented.

The shapes of the components, and the degrees of deformation and deviation shown in FIGS. 3 and 4, are simplified and exaggerated for the purpose of clear illustration.

In summary, arcuate deformation of the connecting pins and arcuate warping of the guide plates is avoided by allowing the guide plates to deform in the direction of chain tension, and, at the same time, the relationships between the frontmost surfaces of the pin holes of the guide link rows and the relationships between the rearmost surfaces of the pin holes of the guide link rows, reduce heat and noise without causing excessive wear and biased loading between the connecting pins and pin holes of the intermediate link plates.

Although the connecting pins in the embodiment described are rocker-type pins composed of long and short rocker pins having arcuate surfaces in mutually facing relationship, advantages of the invention can be realized in a chain having circular cylindrical connecting pins. In such a case, the front and rear connecting pin holes of the guide plates can be circular, and the connecting pin holes of the intermediate link plates can be in the form of circles having a larger diameter than that of the connecting pins, or can have an oval shape elongated in the direction of chain tension.

It is possible to prevent arcuate deformation of the connecting pins and arcuate warping of the guide plates if the guide plates are designed to be deformed by a relatively small force. Thus, the size and strength of the guide plates can be small, as long as the guide plates can hold the connecting pins and restrict widthwise deviation of the chain relative to its sprockets.

The specific shape of the guide plates can vary, provided that each guide plate has end portions with front and rear connecting pin holes and an intermediate portion on the sprocket side of a pitch line extending through the centers of its pin holes, and, when the chain is unloaded, the frontmost edges of the front pin holes of the intermediate link plates of each link row are located forward of the frontmost edges of the front pin holes of the guide plates of the same link row, and the rearmost edges of the rear pin holes of the intermediate link plates of each link row are located rearward of the rearmost edges of the rear pin holes of the guide plates of the same link row. The numbers of link plates in the guide link rows and in the non-guide link rows can, of course, be varied.

What is claimed is:

1. A silent chain in the form of an endless loop extending along a direction of elongation comprising:
guide link rows, each comprising a pair of guide plates and a plurality of intermediate link plates disposed between the guide plates, and non-guide link rows, each comprising a plurality of inner link plates, the guide link rows and non-guide link rows being disposed alternately along the length of the chain, and the guide plates and intermediate plates of the guide link rows being interleaved with the inner link plates of the non-guide link rows, each of said guide plates, said intermediate link plates, and said inner link plates having a front pin hole and a rear pin hole; and
connecting pins extending in a lateral direction perpendicular to said direction of elongation and connecting the guide link rows and non-guide link rows in articulating relationship, the connecting pins having end portions fitted into front and rear pin holes in the guide plates and extending through pin holes in the intermediate link plates of the guide link rows and through pin holes in the inner link plates of the non-guide link rows;
wherein each guide plate has end portions connected by an intermediate portion, the front and rear pin holes of each guide plate being in the end portions thereof;
wherein the intermediate portion of each guide plate is located toward the inside of said endless loop in relation to a pitch line passing through centers of the front and rear pin holes of the guide plate;
wherein each of said front pin holes has a frontmost edge and each of said rear pin holes has a rearmost edge, and, when the chain is unloaded, the frontmost edges of the front pin holes of the intermediate link plates of each guide link row are located forward of the frontmost edges of the front pin holes of the guide plates of said each guide link row, and the rearmost edges of the rear pin holes of the intermediate link plates of said each guide link row are located rearward of the rearmost edges of the rear pin holes of the guide plates of said each guide link row;
wherein the guide plates are deformable in a direction such that, when said chain is under tension, the distance from the front pin hole of each guide plate to the rear pin hole of said each guide plate can increase; and
wherein each of said connecting pins comprises a pair of rocker pins, each said pair of rocker pins consisting of a long rocker pin and a short rocker pin, the long and short rocker pins of each said pair of rocker pins having mutually facing rocker surfaces and the end portions of each pin fitted into front and rear holes in a guide plate are end portions of the long rocker pin of one of said pairs of rocker pins.

2. The silent chain according to claim 1, wherein, when said chain is under tension, the guide plates are deformable to an extent such that the frontmost edges of the front pin holes of the intermediate link plates of said each guide link row and the frontmost edges of the front pin holes of the guide plates of said each guide link row are intersected by a first imaginary line extending parallel to said lateral direction perpendicular to said direction of elongation, and the rearmost edges of the rear pin holes of the intermediate link plates of said each guide link row and the rearmost edges of the rear pin holes of the guide plates of said each guide link row are intersected by a second imaginary line extending parallel to said lateral direction perpendicular to said direction of elongation.

3. The silent chain according to claim 1, wherein, when said chain is under tension, the guide plates are deformable to an extent such that the frontmost edges of the front pin holes of the intermediate link plates of said each guide link row and the frontmost edges of the front pin holes of the guide plates of said each guide link row are intersected by a first imaginary line extending parallel to said lateral direction perpendicular to said direction of elongation, and the rearmost edges of the rear pin holes of the intermediate link plates of said each guide link row and the rearmost edges of the rear pin holes of the guide plates of said each guide link row are intersected by a second imaginary line extending parallel to said lateral direction perpendicular to said direction of elongation, wherein the shapes of the frontmost edges of the intermediate link plates of said each guide link row are the same as the shapes of the frontmost edges of the front pin holes of the guide plates of said each guide link row, and wherein the shapes of the rearmost edges of the intermediate link plates of said each guide link row are the same as the shapes of the rearmost edges of the pin holes of the guide plates of said each guide link row.

* * * * *